US008797629B2

(12) United States Patent
De Smet et al.

(10) Patent No.: US 8,797,629 B2
(45) Date of Patent: Aug. 5, 2014

(54) METHOD FOR OPERATING A MICROMIRROR DEVICE WITH ELECTROMECHANICAL PULSE WIDTH MODULATION

(75) Inventors: Herbert De Smet, Destelbergen (BE); Roel Beernaert, Gent (BE)

(73) Assignees: IMEC, Leuven (BE); Universiteit Gent, Ghent (BE)

( * ) Notice: Subject to any disclaimer, the term of this patent is extended or adjusted under 35 U.S.C. 154(b) by 282 days.

(21) Appl. No.: 13/252,927

(22) Filed: Oct. 4, 2011

(65) Prior Publication Data

US 2012/0062978 A1 Mar. 15, 2012

Related U.S. Application Data

(63) Continuation of application No. PCT/EP2010/055190, filed on Apr. 20, 2010.

(60) Provisional application No. 61/172,591, filed on Apr. 24, 2009.

(30) Foreign Application Priority Data

Sep. 24, 2009 (EP) .................................... 09171185

(51) Int. Cl.
*G02B 26/00* (2006.01)
*G02B 26/02* (2006.01)
*G02B 26/08* (2006.01)

(52) U.S. Cl.
USPC ........ 359/290; 359/291; 359/295; 359/213.1; 359/224.1; 359/225.1; 310/309

(58) Field of Classification Search
USPC ........ 359/290–295, 298, 213.1, 220.1, 225.1, 359/224.1, 847, 872; 355/67, 77; 310/309; 216/24, 37; 73/504.02, 514.32
See application file for complete search history.

(56) References Cited

U.S. PATENT DOCUMENTS

| | | | |
|---|---|---|---|
| 5,583,688 | A | 12/1996 | Hornbeck |
| 6,147,790 | A | 11/2000 | Meier et al. |
| 6,466,358 | B2 | 10/2002 | Tew |

(Continued)

OTHER PUBLICATIONS

L.J. Hornbeck, "Digital Light Processing and MEMS: Timely Convergence for a Bright Future", Proc. SPIE, vol. 2639, p. 2, 1995.

(Continued)

*Primary Examiner* — Loha Ben
(74) *Attorney, Agent, or Firm* — Knobbe Martens Olson & Bear LLP

(57) ABSTRACT

A method of operating by pulse width modulation a micromirror device is disclosed. In one aspect, the method includes providing a micromirror device having a micromirror element electrostatically deflectable around a rotation axis between a first and second position. The micromirror element is controllable by applying voltage signals to a first and second electrode on one side of the rotation axis and a third and fourth electrode on the other side. The method includes associating an intermediate value of intensity to the micromirror element during a time frame, the intensity being between a first value corresponding to the first position and a second value corresponding to the second position. The method includes switching the micromirror element between the first and second position. The intermediate value corresponds to the ratio of periods in the time frame in which the micromirror element is in the first or second position.

18 Claims, 16 Drawing Sheets

(56) References Cited

U.S. PATENT DOCUMENTS

| | | | | |
|---|---|---|---|---|
| 6,657,759 | B2 * | 12/2003 | Muller | 359/225.1 |
| 6,778,304 | B1 * | 8/2004 | Muller | 359/225.1 |
| 6,825,968 | B2 | 11/2004 | Aubuchon | |
| 6,909,530 | B2 * | 6/2005 | Muller | 359/198.1 |
| 7,030,537 | B2 * | 4/2006 | Staple et al. | 310/309 |
| 7,046,422 | B2 * | 5/2006 | Kimura et al. | 359/295 |
| 7,161,274 | B2 * | 1/2007 | Tsuboi et al. | 310/309 |
| 7,164,522 | B2 * | 1/2007 | Kimura et al. | 359/290 |
| 7,420,315 | B2 * | 9/2008 | Yoda | 310/309 |
| 8,154,474 | B2 * | 4/2012 | Ishii et al. | 345/32 |
| 2006/0109539 | A1 | 5/2006 | Katoh et al. | |

OTHER PUBLICATIONS

Bochobza-Degani et al., "Micromirror device with reversibly adjustable properties", IEEE Photonics Technology Letters, vol. 15, Bo. 5, pp. 733-735, 2003.

International Search Report for International Application No. PCT/EP2010/055190 dated Jun. 25, 2010 by European Patent Office.

* cited by examiner

9(a)

9(b)

9(c)

10(a)

10(b)

10(c)

14(c)

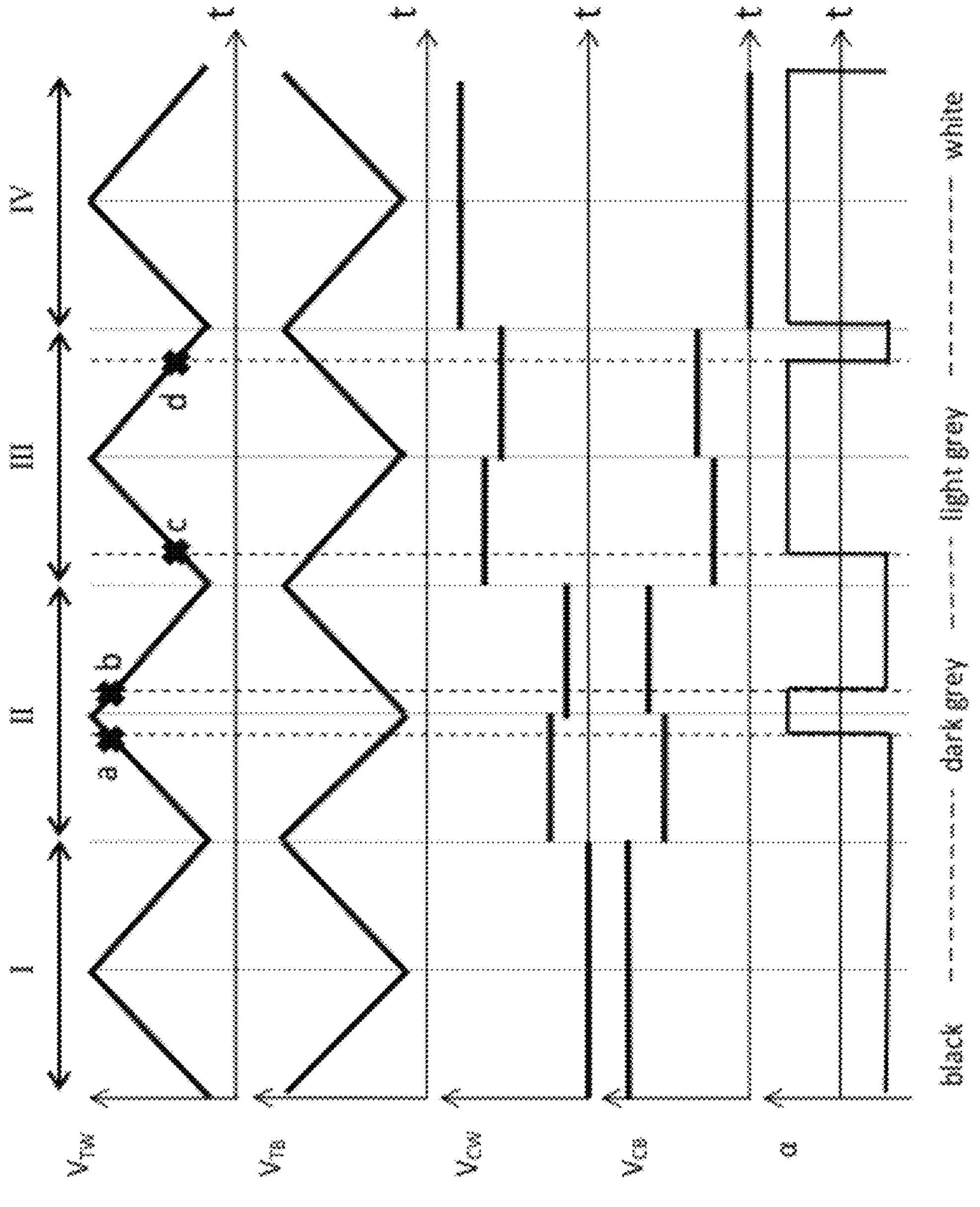
14 (a)

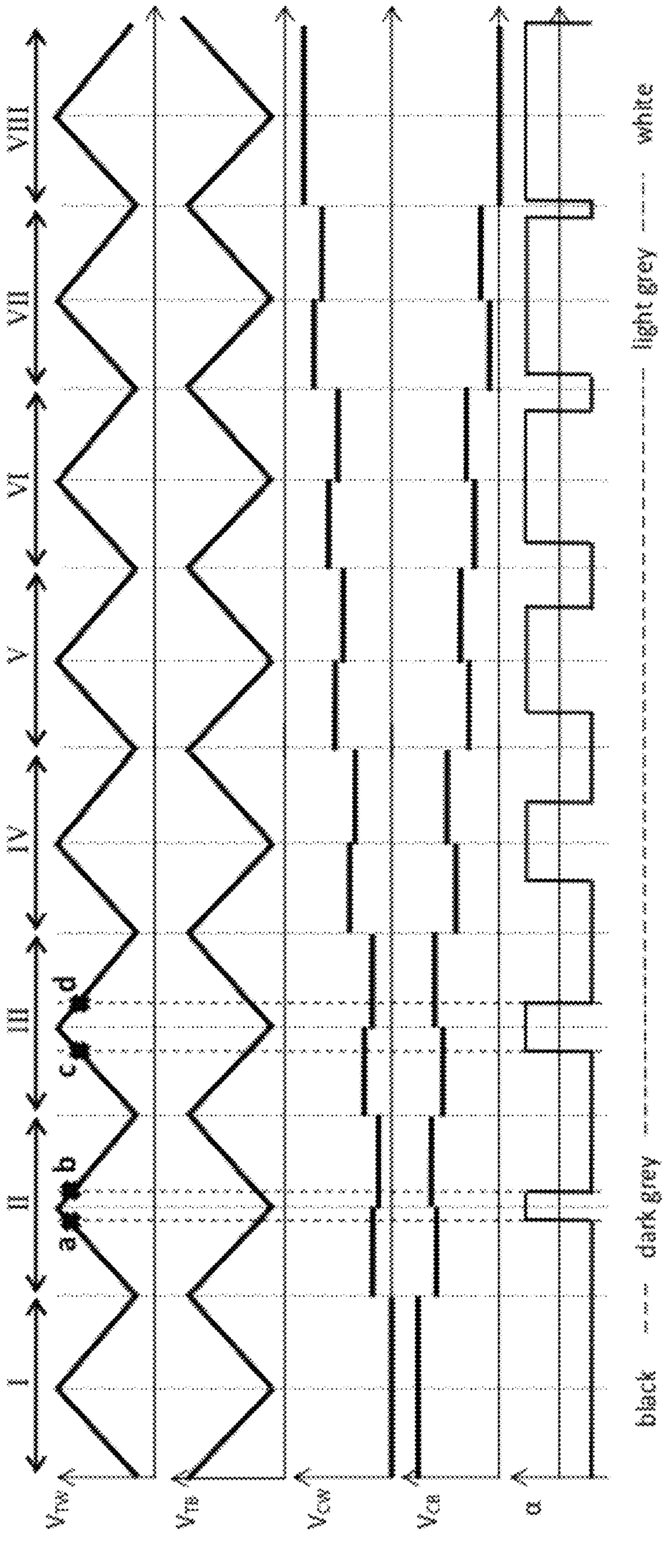
14 (b)

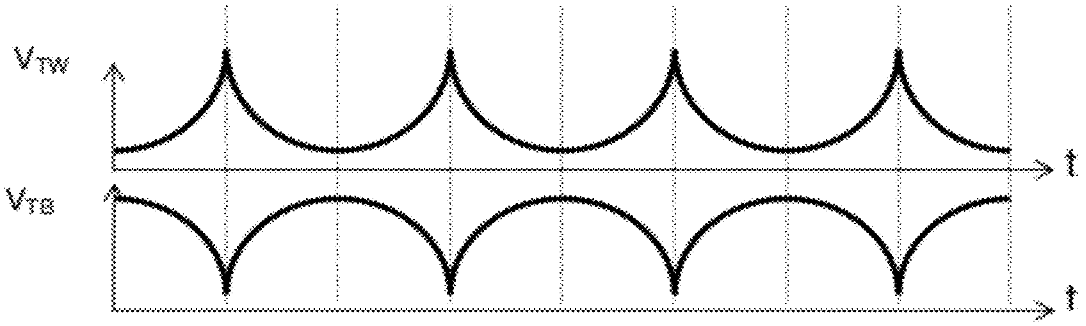
18(a)

18(b)

METHOD FOR OPERATING A MICROMIRROR DEVICE WITH ELECTROMECHANICAL PULSE WIDTH MODULATION

CROSS REFERENCE TO RELATED APPLICATIONS

This application is a continuation of PCT Application No. PCT/EP2010/055190, filed Apr. 20, 2010, which claims priority under 35 U.S.C. §119(e) to U.S. provisional patent application 61/172,591 filed Apr. 24, 2009. Each of the above applications is incorporated herein by reference in its entirety.

BACKGROUND OF THE INVENTION

1. Field of the Invention

The disclosed technology relates to a micromirror device and in particular to a method for operating such a micromirror device.

2. Description of the Related Technology

Micromirrors are microelectromechanical systems (MEMS) that can be used in several applications, ranging from scanning mirrors (optical scanning, optical switching) to projection displays.

For example, the digital micromirror device (DMD), described by L. J. Hornbeck in "Digital Light Processing and MEMS: Timely Convergence for a Bright Future", Proc. SPIE, Vol. 2639, p. 2, 1995, comprises a micromirror array used as a spatial light modulator (SLM) in projection displays. The DMD comprises an array of light switches that use electrostatically controlled MEMS mirrors to modulate light digitally, thereby producing images on a screen.

The mirrors, with a one-to-one relationship to the pixels of the display, are arranged in a rectangular array. They can rotate between two extreme positions depending on the state of an underlying memory cell, and thus reflect incoming light into a lens (ON state) or not into the lens (OFF state).

The ON state corresponds to a pixel on the screen that is illuminated ("white" pixel) and the OFF state corresponds to a dark pixel ("black" pixel) on the screen.

For producing the sensation of grayscale to the observer's eye, binary pulse width modulation (PWM) is used. Video frames are divided into n sub-frames. During every sub-frame, a mirror is either in the ON state (white) or in the OFF state (black). Assuming a light source with constant intensity, the ratio of ON and OFF states within a frame then determines the gray level of the pixel for that frame.

Using this method, the number and the distribution of gray levels depends on the number of binary sub-frames or bitplanes. With n sub-frames or bitplanes this method gives rise to (n+1) linear gray levels. Digital Pulse width modulation may lead to severe speed requirements (data transfer rates) for the on-chip electronics and for complete elimination of contouring effects.

In U.S. Pat. No. 6,466,358 an analog pulse width modulation (PWM) method is described that can be used for addressing a digital micromirror array. This method solves some of the problems related to binary pulse width modulation, such as the high cost in terms of data transfer rates and the hardware needed to sample and process the image data.

In the method described in U.S. Pat. No. 6,466,358, the voltage signal applied to the micromirror addressing electrodes results from a comparison between analog input signals. This comparison is done by means of a transistor circuit in the CMOS layer, i.e. this analog PWM occurs at the electronic level. For each pixel, there is a need for at least six transistors that can withstand large voltages, leading to relatively large chip area consumption.

Furthermore, as the method is based on a comparison between analog voltages, switching of a micromirror depends on a transistor threshold voltage. It may be difficult to control this threshold voltage accurately, and furthermore the threshold voltage may vary on a chip and thus it may be different from pixel to pixel. This may cause fixed pattern noise.

U.S. Pat. No. 5,583,688 discloses a digital micromirror device, wherein a mirror is supported by a center support post attached to two torsion hinges by a landing hinge yoke. The ends of the torsion hinges are attached to two support posts which hold the hinges above the substrate and allow the hinges to twist in a torsional fashion.

US2006/109539 discloses a method for driving an optical deflecting device array, which arranges a plurality of optical deflecting mirrors. In the disclosed method, the mirror position is controlled by several sets of electrodes, each electrode corresponding to one possible mirror position.

SUMMARY OF CERTAIN INVENTIVE ASPECTS

Certain inventive aspects relate to a method for controlling a micromirror device that does not present the drawbacks of prior art methods.

More particularly, certain inventive aspects relate to a micromirror device comprising at least one micromirror that can be deflected electrostatically, and a method for operating such micromirror device, wherein gray levels can be produced by means of an analog pulse width modulation method without the need for providing an electronic comparator circuit, i.e. without the need for providing additional transistors in the CMOS layer below the micromirror structure.

It is an advantage of certain inventive aspects that fixed pattern noise resulting from differences in transistor threshold voltages, as may be the case in prior art solutions, can be avoided.

It is an advantage of certain inventive aspects that the number of transistors needed per pixel and thus the chip area needed per pixel is substantially smaller than in prior art solutions.

Certain inventive aspects relate to a micromirror device that can be used as a light switch or a spatial light modulator, e.g. in a projection display.

Certain inventive aspects relate to a method for operating a micromirror device by pulse width modulation (PWM) providing an amount of grey levels not depending on the number of subframes or bitplanes. The levels can be chosen arbitrarily, allowing less severe speed requirements for the electronic layer below the MEMS, less image processing hardware and memory.

Certain inventive aspects relate to a method for operating by pulse width modulation a micromirror device comprising the steps of: providing a micromirror device comprising at least one micromirror element being electrostatically deflectable around a rotation axis between at least two positions being a first position and a second position, by applying voltage signals to at least four electrodes controlling the micromirror element, the first and second electrodes being located on one side of the rotation axis, and the third and fourth electrodes on the other side; associating an intermediate value of intensity to the micromirror element during a time frame, the intensity being comprised between a first value and a second value, the first value corresponding to the first position and the second value corresponding to the second position; switching the micromirror element between the first position and the second position and vice-versa so that the micromirror element is either in the first position or in the second position whereby the intermediate value of intensity between the first value and the second value is obtained, the intermediate value of intensity corresponding to the ratio of the periods of time in a time frame in which the micromirror element is either in the first position or in the second position; wherein the switching is obtained by applying fixed voltage signals to the second and third electrodes during the time frame, and periodic voltage signals having a period equal to the length of the time frame to the first and fourth electrodes.

The intensity or intensity value is the measurable amount of a property, such as brightness, light intensity, gray level or colored level.

A time frame is the shortest period of time on which an intermediate intensity is defined. This usually corresponds to one individual picture time in motion picture (e.g. 1/50 s in television PAL or SECAM standards, or 1/24 s in film), or eventually corresponds to one individual color picture (i.e. red, green or blue picture in RGB) in case that individual colors are produced sequentially on the same micromirror device (1/150 s in PAL or SECAM, 1/72 s in film).

In one aspect, the method further discloses at least one or a suitable combination of the following features:

- the periodic signals are characterized by a monotonic variation in a first half of their period, and a monotonic variation in a second half of their period;
- the periodic voltage signals corresponds to voltage differences that are directly applied between the micromirror element and the first and fourth electrodes while the second and third fixed voltage signals corresponds to voltage differences that are applied between the micromirror element and the second and third electrodes;
- the first and fourth voltage signals are antiphase signals;
- the periodic voltage signals are in the form of a triangular waveform, a saw-tooth waveform, gamma corrected triangular waveform or sinusoidal waveform signal;
- the first value of intensity corresponds to a white pixel while the second value of intensity corresponds to a black pixel with intermediate value of intensity corresponding to gray levels in between; and
- the first value of intensity corresponds to a colored status while the second value of intensity corresponds to a non colored status with intermediate colored levels in between.

Another inventive aspect relates to a micromirror device comprising: at least one micromirror, each micromirror being able to rotate along an axis parallel to the micromirror from a first position to a second position; a substrate underneath the micromirror; at least four controlling electrodes for each micromirror, being a first and a second set of two controlling electrodes, each of the set having electrodes located on each sides of the rotation axis of each micromirror, wherein each electrode of the second set of electrodes is connected to a circuit able to keep fixed analog voltage signal during half a time frame.

In one aspect, the device further discloses at least one or a suitable combination of the following features:

- the circuit connected to each electrode of the second set of electrodes comprises a storage capacitor able to keep a fixed analog voltage during a time frame;
- the circuit connected to each electrode of the second set of electrodes comprises a MOSFET switch;
- the first set of electrodes comprises two subsets of electrodes, each subset comprising one electrode corresponding to each micromirror, the electrodes within each subset being connected to a circuit arranged to provide the same signal to the electrodes; and
- the electrodes within each subset are connected in parallel, alternatively, they can be connected in series on a low resistive circuit, as far as the signal variation on the serial circuit is acceptable.

In one aspect, the device is suitable for being operated by the method as described herein.

In a further aspect, there is a spatial light modulator comprising a micromirror device described herein.

BRIEF DESCRIPTION OF THE DRAWINGS

FIG. 14(*b*) shows control signals on the electrodes of a micromirror and the mirror angle, in accordance with one embodiment with eight gray levels.

FIG. 14 (*c*) shows a micromirror in a first tilted position and illustrates the mirror angle $\alpha$.

DETAILED DESCRIPTION OF CERTAIN ILLUSTRATIVE EMBODIMENTS

Figure 1:
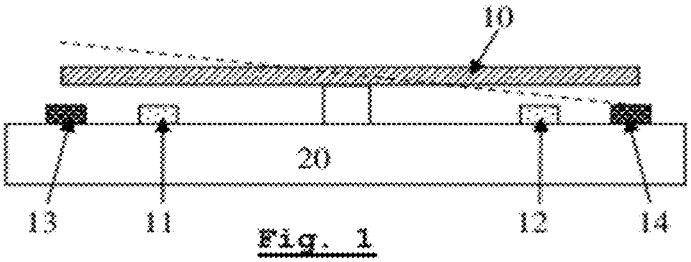
FIG. 1 shows a cross section of a prior art micromirror structure that can be electrostatically rotated.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Certain embodiments relate to a method for operating a micromirror device comprising at least one micromirror that can be deflected electrostatically around a rotation axis between a first tilted position and a second tilted position, the micromirror device comprising at least four addressing electrodes for each of the at least one micromirror, a first and a second addressing electrode being located at a first side of the rotation axis and a third and a fourth addressing electrode being located at a second side of the rotation axis.

In one embodiment, the micromirror device is first calibrated, wherein calibrating comprises determining a first pull-in voltage and a first pull-out voltage on the first electrode as a function of a first fixed voltage difference between the second electrode and the at least one micromirror and determining a second pull-in voltage and a second pull-out voltage on the fourth electrode as a function of a second fixed voltage difference between the third electrode and the at least one micromirror.

In one embodiment, operating the micromirror device comprises:

- applying a first periodic voltage difference between the first electrode and the at least one micromirror, the first periodic voltage difference having a predetermined period and varying monotonically during a first half of the period and during a second half of the period;
- applying a second periodic voltage difference between the fourth electrode and the at least one micromirror, the second periodic voltage difference having the predetermined period and varying monotonically during the first half of the period and during the second half of the period; deflecting the at least one micromirror to the first tilted position;
- selecting within a period a first switching point for the at least one micromirror; and
- deflecting the at least one micromirror at the first switching point to the second tilted position by applying between the third electrode and the at least one micromirror a second fixed voltage difference for which the corresponding second pull-in voltage substantially equals the second periodic voltage difference at the first switching point and applying between the second electrode and the at least one micromirror a first fixed voltage difference that is equal to or lower than the first fixed voltage difference for which the corresponding first pull-out voltage substantially equals the first periodic voltage difference at the first switching point.

The method may further comprise:

selecting within the period a second switching point for the at least one micromirror; and deflecting the at least one micromirror at the second switching point to the first tilted position by applying between the second electrode and the at least one micromirror a first fixed voltage difference for which the corresponding first pull-in voltage substantially equals the first periodic voltage difference at the second switching point and applying between the third electrode and the at least one micromirror a second fixed voltage difference that is equal to or lower than the second fixed voltage difference for which the corresponding second pull-out voltage substantially equals the second periodic voltage difference at the second switching point.

The predetermined period may correspond to an image frame or a video frame or a color sequential frame. The first tilted position may correspond to an OFF state or a black pixel and the second tilted position may correspond to an ON state or a white pixel, or vice versa the first tilted position may correspond to an state or a white pixel and the second tilted position may correspond to an OFF state or a black pixel.

In one embodiment, the first switching point and the second switching point can be selected according to a predetermined duty ratio of the at least one micromirror.

Selecting a first switching point and/or selecting a second switching point can be done in each period of the periodic signals. The predetermined duty ratio can for example correspond to a predetermined gray value of a pixel.

The micromirror device may comprise a plurality of micromirrors, for example an array of micromirrors. The first periodic voltage difference and the second periodic voltage difference may be the same for each of the plurality of micromirrors.

In one embodiment, the first electrode and the fourth electrode may be outer electrodes and the second electrode and the third electrode may be inner electrodes located in between the outer electrodes.

Alternatively, the second electrode and the third electrode may be outer electrodes and the first electrode and the fourth electrode may be inner electrodes located in between the outer electrodes.

A method according to one embodiment may for example be used for operating a micromirror device acting as a spatial light modulator or as a light switch, for example in a projection display.

One embodiment relates to a micromirror device comprising at least one micromirror that can be deflected electrostatically, and a method for operating such micromirror device.

The micromirror device and the addressing method may allow gray levels to be produced by means of an analog pulse width modulation method without the need for providing an electronic comparator circuit, i.e. without the need for additional transistors in the CMOS layer below the micromirror structure.

Instead, analog pulse width modulation (PWM) is achieved at the MEMS level, based on an electro-mechanical phenomenon known as 'pull-in'. It is an advantage of one embodiment that fixed pattern noise resulting from differences in transistor threshold voltages, as may be the case in prior art solutions, can be avoided.

In combination with an active matrix circuit this allows to make a micromirror pixel matrix that obeys analog voltages.

It is an advantage of one embodiment that the number of transistors needed per pixel and thus the chip area needed per pixel is less than in prior art solutions.

The micromirror device of one embodiment can for example be used as a light switch or a spatial light modulator, e.g. in a projection display.

Certain embodiments will now be described by a detailed description. It is clear that other embodiments can be configured according to the knowledge of persons skilled in the art without departing from the true spirit or technical teaching of the invention, the invention being limited only by the terms of the appended claims.

A schematic illustration of a prior art micromirror device comprising a micromirror 10 that can be electrostatically rotated or deflected is shown in FIG. 1.

The micromirror 10 may be suspended in such a way that it is able to rotate between two extreme positions. Examples of such micromirror suspensions are described in the prior art, such as e.g. in U.S. Pat. Nos. 5,583,688 or in 6,147,790, each of which is incorporated herein by reference in its entirety. Any other micromirror suspension method known by a person skilled in the art can be used.

When a voltage difference is applied between the micromirror 10 and an address electrode 12, e.g. located on the substrate 20 underneath the micromirror 10, the micromirror 10 is electrostatically attracted towards the address electrode 12. When increasing this voltage difference, at a certain voltage difference value the micromirror 10 pulls in to the most extreme position (first tilted position) near to the attracting address electrode 12. The corresponding voltage difference value is called the pull-in voltage.

At the pull-in moment, the electrostatic force attracting the micromirror 10 towards the address electrode 12 is stronger than the mechanical counteraction of the mirror (for example resulting from the torque in a hinge). The micromirror 10 pulls in to the most extreme position at which a dedicated object such as e.g. a landing electrode 14 leads to obstruction. This extreme micromirror position is schematically illustrated by a dashed line in FIG. 1.

When decreasing the voltage difference between the micromirror 10 and the address electrode 12, at a certain voltage difference value the micromirror 10 releases and the micromirror 10 returns to its horizontal position (wherein the horizontal position is a position wherein the micromirror surface is substantially parallel to the substrate surface). This voltage difference is called the pull-out voltage.

The micromirror illustrated in FIG. 1 can similarly be pulled into a second extreme position (second tilted position), by applying a voltage difference between the micromirror 10 and a second address electrode 11, wherein electrode 13 acts as a landing electrode.

One embodiment provides a micromirror device comprising at least one micromirror that can be deflected electrostatically, and a method for operating such micromirror device. The micromirror device can for example comprise a plurality of electrostatically deflectable micromirrors, e.g. an array of electrostatically deflectable micromirrors.

Figure 2:
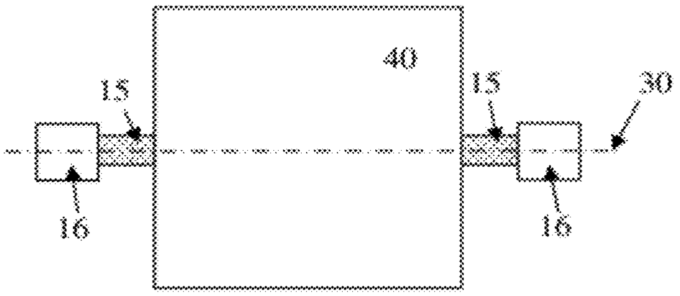
FIG. 2 shows a top view of a micromirror configuration with hinges at two opposite sides of the micromirror.
Figure 3:
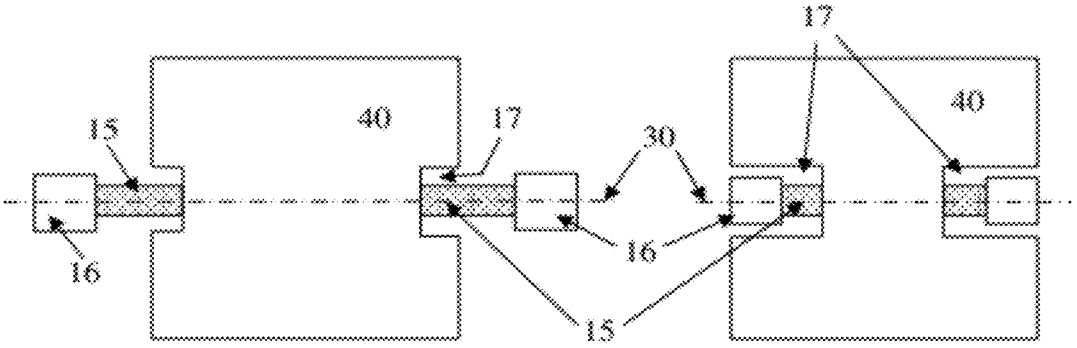
FIG. 3 shows a top view of micromirror configurations with hinges at two opposite sides of the micromirror and with notches at both sides of the hinge attachment point.
Figure 4:
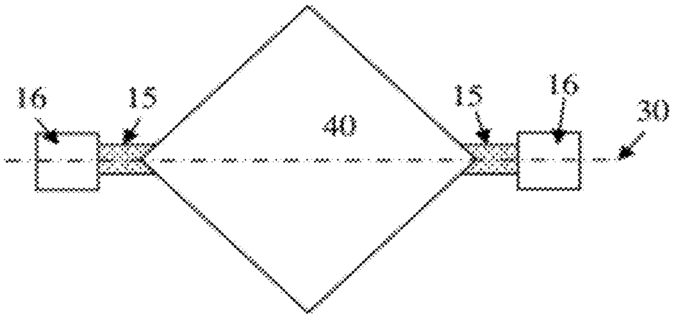
FIG. 4 shows a top view of a micromirror configuration with hinges at two opposite corners of the micromirror.
Figure 5:
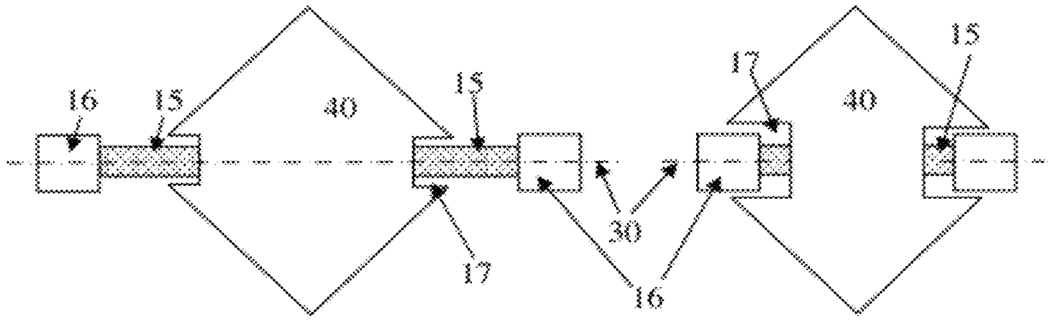
FIG. 5 shows a top view of micromirror configurations with hinges at two opposite corners of the micromirror and with notches at both sides of the hinge attachment point.

In one embodiment, any suitable mirror that can be switched or rotated between two extreme positions can be used. Some examples of micromirror configurations that can be used are illustrated in FIGS. 2 to 5. In these micromirror configurations, the micromirror 40 is suspended by means of two hinges 15 attached to fixation structures 16 and located along an axis 30 (e.g. an axis of symmetry of the micromirror 40), such that the micromirror 40 can rotate around that axis 30 between two extreme micromirror positions. For example, hinges 15 can be provided at the middle of two opposite sides of the micromirror 40 (as illustrated in FIGS. 2 and 3), or at two opposite corners of the micromirror 40 (as illustrated in FIGS. 4 and 5).

To increase the effective length of the hinges 15, thereby reducing their overall stiffness, notches 17 can be provided in the micromirror 40 at both sides of the hinge attachment point, i.e. at both sides of the region where the hinges 15 are attached to the micromirror 40 (as illustrated in FIGS. 3 and 5). The notches 17 may be configured and dimensioned in such a way that the fixation structures 16 to which the hinges 15 are fixed can be positioned in between the notches (as illustrated in the right hand side pictures of FIGS. 3 and 5). It is an advantage of such a configuration that the total area needed per micromirror can be reduced.

Figure 6:
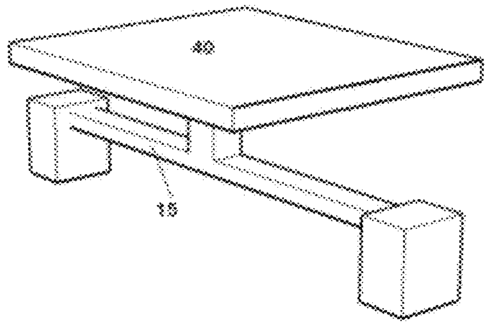
FIG. 6 shows a micromirror configuration with a single hinge extending over the micromirror length and supporting the micromirror.

Instead of pulling in the micromirror 40 itself, it is also possible to pull in an electrically conducting yoke that supports the actual micromirror. If this yoke is reduced to only a hinge, the micromirror 40 can be supported on the hinge 15 and thereby attached (as illustrated in FIG. 6).

With address electrodes located on a substrate underneath the micromirror 40, at least one address electrode at each of the two sides of the axis 30, two extreme pull-in states (corresponding to two extreme mirror positions, e.g. a first tilted position and a second tilted position) can be achieved.

Although in the drawings only rectangular mirrors are shown, other mirror shapes can be used. For example, polygonal shapes or shapes comprising curved edges can be used.

Figure 11:
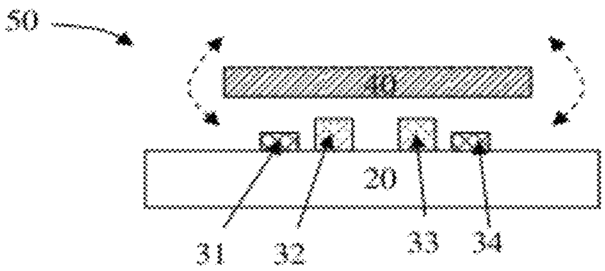
FIG. 11 shows a micromirror and an electrode configuration according to one embodiment.

A micromirror device 50 according to one embodiment illustrated in FIG. 11 comprises at least one micromirror 40 and at least four addressing electrodes per micromirror 40, the at least four addressing electrodes being located on a substrate 20 underneath the micromirror 40, two addressing electrodes being located at each of the two sides of the axis 30 around which the micromirror 40 can rotate.

In the further description, the electrodes located closest to the outer edges of the micromirror 40 are referred to as outer electrodes. A first outer electrode is located at a first side of the axis 30 around which the micromirror 40 can rotate and a second outer electrode is located at a second side of the axis 30 around which the micromirror 40 can rotate.

The two remaining electrodes are located in between the first outer electrode and the second outer electrode and are referred to as inner electrodes. A first inner electrode is located at the first side of the axis 30 around which the micromirror 40 can rotate and a second inner electrode is located at the second side of the axis 30 around which the micromirror 40 can rotate.

A micromirror device according to one embodiment may also comprise a stop configuration such as e.g. a landing electrode, preferably at both sides of the axis 30.

Electrode configurations that may be used for addressing micromirrors of one embodiment are illustrated in FIGS. 7 to 10. Although the electrodes shown in these figures have a rectangular shape, other electrode shapes may be used such as for example polygon shapes or curved shapes.

Figure 7:
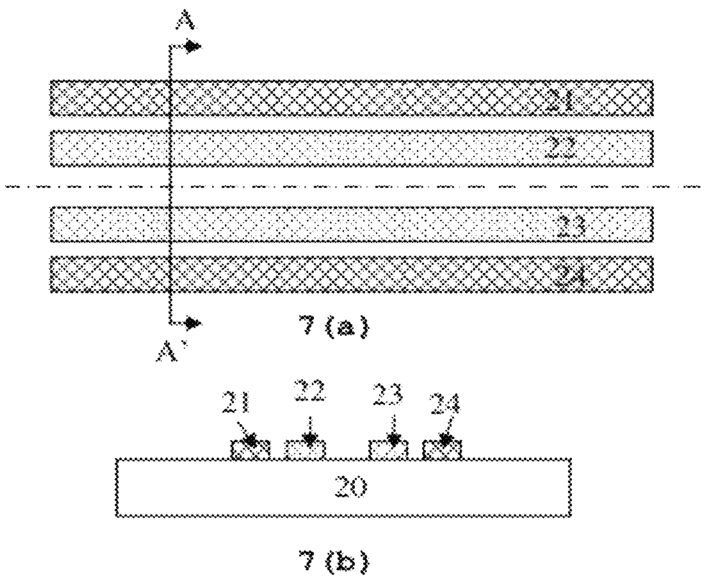
FIG. 7 shows an electrode configuration with four rectangular electrodes of substantially equal height.

FIG. 7 shows a top view (FIG. 7(*a*) and a cross section along line A-A' (FIG. 7(*b*)) for a configuration comprising four rectangular electrodes 21, 22, 23, 24 of substantially equal height (the height being defined as the size in a direction substantially orthogonal to the substrate), the four electrodes being positioned substantially parallel to each other. In FIG. 7, electrode 21 is the first outer electrode, electrode 22 is the first inner electrode, electrode 23 is the second inner electrode and electrode 24 is the second outer electrode.

Figure 8:
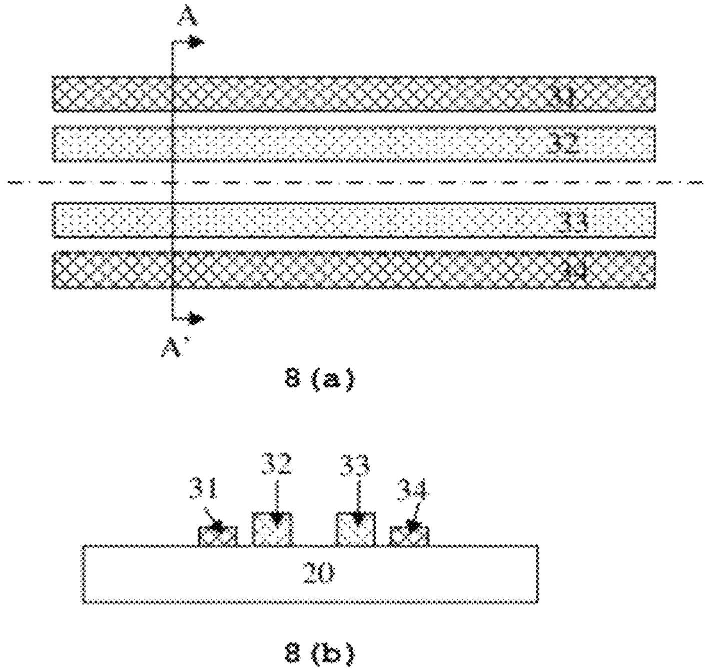
FIG. 8 shows an electrode configuration with four rectangular electrodes, the inner electrodes being higher than the outer electrodes.

In an alternative configuration, illustrated in FIG. 8, the height of the first inner electrode 32 and the second inner electrode 33 is larger than the height of the first outer electrode 31 and the second outer electrode 34. This may yield a stronger attraction of the micromirror.

Figure 9:
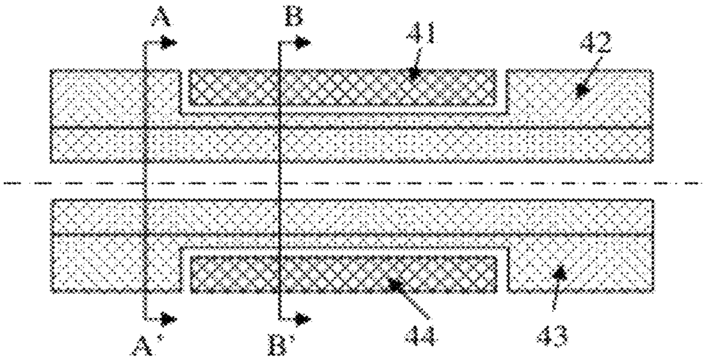
FIG. 9 shows an electrode configuration with four electrodes, the inner electrodes having two stages.
Figure 9:
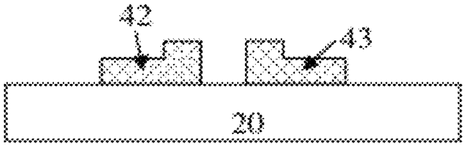
Figure 9:
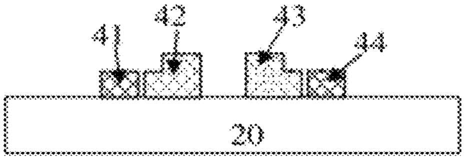
Figure 10:
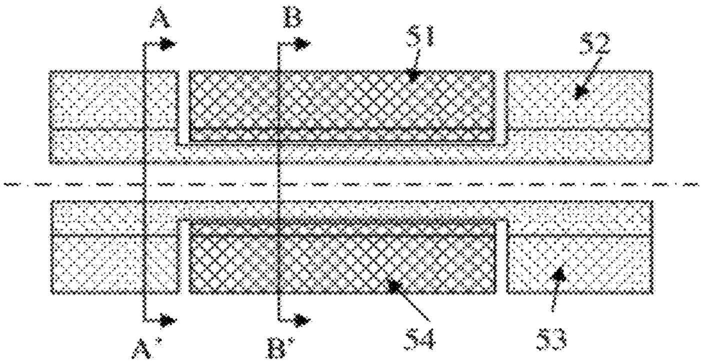
FIG. 10 shows an electrode configuration with four electrodes, each electrode having two stages.
Figure 10:
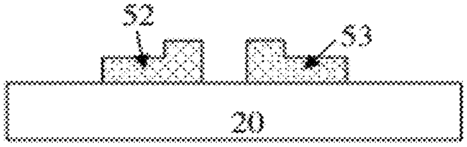
Figure 10:
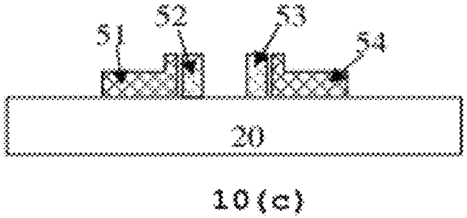

As illustrated in FIGS. 9 and 10, electrodes with several stages (as e.g. disclosed in U.S. Pat. No. 6,825,968) can be provided to improve attraction of the micromirror. FIG. 9 shows a top view (FIG. 9(*a*)), a cross section along line A-A' (FIG. 9(*b*)) and a cross section along line B-B' (FIG. 9(*c*)) for a configuration wherein the first inner electrode 42 and the second inner electrode 43 comprise two stages and wherein the first outer electrode 41 and the second outer electrode 44 comprise a single stage. FIG. 10 shows a top view (FIG. 10(*a*)), a cross section along line A-A' (FIG. 10(*b*)) and a cross section along line B-B' (FIG. 10(*c*)) for a configuration wherein the first outer electrode 51, the first inner electrode 52, the second inner electrode 53 and the second outer electrode 54 comprise two stages. Other configurations are possible, for example configurations wherein at least part of the electrodes comprise multiple stages.

One embodiment of a micromirror device 50 is illustrated in FIG. 11, showing the substrate 20 with four electrodes 31, 32, 33, 34 and a micromirror 40. It combines a micromirror configuration as illustrated in FIG. 3 with an electrode configuration as illustrated in FIG. 8.

However, other combinations of micromirror configurations and electrode configurations can be used.

FIG. 11 shows one micromirror 40, but a micromirror device 50 of one embodiment can comprise a plurality of micromirrors 40, e.g. an array of micromirrors 40. Four separate electrodes 31, 32, 33, 34 are provided for each micromirror 40. The micromirror 40 of one embodiment can switch between two extreme positions, i.e. between a first tilted position wherein the micromirror 40 is attracted by the address electrodes 31, 32 located at a first side of the axis 30 around which the micromirror 40 can rotate, and a second tilted position whereby the micromirror 40 is attracted by the address electrodes 33, 34 located at a second side of the axis 30 around which the micromirror 40 can rotate. For such a device comprising an array of micromirrors, the electrodes and micromirror configurations are not limited to the configuration represented in FIG. 11, but can be any of the previously described micromirror and electrodes configurations.

When the micromirror device 50 of one embodiment is used as part of e.g. a projection display, the first tilted position of a micromirror 40 can for example correspond to a black pixel and the second tilted position of a micromirror 40 can for example correspond to a white pixel.

In one embodiment, the duty ratio of a micromirror 40 in such a micromirror device 50 is defined as the fraction of a period (e.g. image frame) during which the micromirror is in a tilted position corresponding to a white pixel, e.g. in the second titled position.

In one embodiment, the duty ratio of a micromirror 40 is dependent on fixed voltages differences provided between the micromirror 40 and two out of the four electrodes underneath the micromirror, the other electrodes being driven with periodic waveforms.

In one embodiment, fixed voltage differences are provided between the micromirror 40 and the inner electrodes and periodic voltage differences are provided between the micromirror 40 and the outer electrodes. However, fixed voltages differences can also be provided between the micromirror 40 and the outer electrodes and periodic voltage differences can be provided between the micromirror 40 and the inner electrodes. Other combinations of voltage signals can be used.

In one embodiment, a fixed voltage difference is a voltage difference that remains substantially at a same value during half a period, wherein a period corresponds e.g. to an image frame or a color sequential frame.

In one embodiment, the period of the periodic voltage differences also corresponds e.g. to an image frame or a color sequential frame. Those periodic voltages may also be characterized by a monotonic variation in a first half of their period, and a monotonic variation in a second half of their period.

For example, when a voltage difference with a periodic waveform is applied between the micromirror 40 and the first outer electrode 41 and a fixed voltage difference is applied between the micromirror 40 and the first inner electrode 42, at a value of the voltage difference that is sufficiently high to make the micromirror 40 rotate, the micromirror 40 rotates to the first tilted position. The first pull-in voltage of such a structure can be defined as the voltage difference between the micromirror 40 and the first outer electrode 41 for which the micromirror 40 pulls in towards the first side. The value of the fixed voltage difference between the micromirror 40 and the first inner electrode 42 can influence the pull-in voltage of this structure. Vice-versa, when a voltage difference with a periodic waveform is applied between the micromirror 40 and the second outer electrode 44 and a fixed voltage difference is applied between the micromirror 40 and the second inner electrode 43, at a value of the voltage difference between the micromirror 40 and the second outer electrode 44 that is sufficiently high to make the micromirror 40 rotate, the micromirror rotates to the second tilted position.

The second pull-in voltage can be defined as the voltage difference value between the micromirror 40 and the second outer electrode 44 for which the micromirror 40 pulls in towards the second side. The value of the fixed voltage difference between the micromirror 40 and the second inner electrode 43 can influence the second pull-in voltage of this structure.

When providing a second pull-in voltage between the micromirror 40 and the second outer electrode 44, in one embodiment a first pull-out voltage can be provided between the micromirror 40 and the first outer electrode 41 such that the micromirror 40 can be properly released (and vice versa). The pull-in and pull-out voltages can be influenced by the fixed voltage differences between the micromirror and the inner electrodes, and they may influence each other, depending on the design of the micromirror device.

Alternatively, instead of providing a first (respectively second) pull-out voltage between the micromirror 40 and the first (respectively second) outer electrode, a voltage difference that is smaller than the first (respectively second) pull-out voltage can be provided between the micromirror 40 and the outer electrodes. For example, a zero voltage difference can be provided between the micromirror 40 and the outer electrodes.

In order to analyze the influence of a fixed voltage difference between a micromirror 40 and an inner electrode on the pull-in voltage of a micromirror device of one embodiment, a finite element simulation (COMSOL multiphysics) was done, considering two electrodes (e.g. first outer electrode 21 and first inner electrode 22) at one side of the axis 30 around which the micromirror 40 can rotate. It was assumed that the voltage on the micromirror 40 was 0 V.

Figure 13:
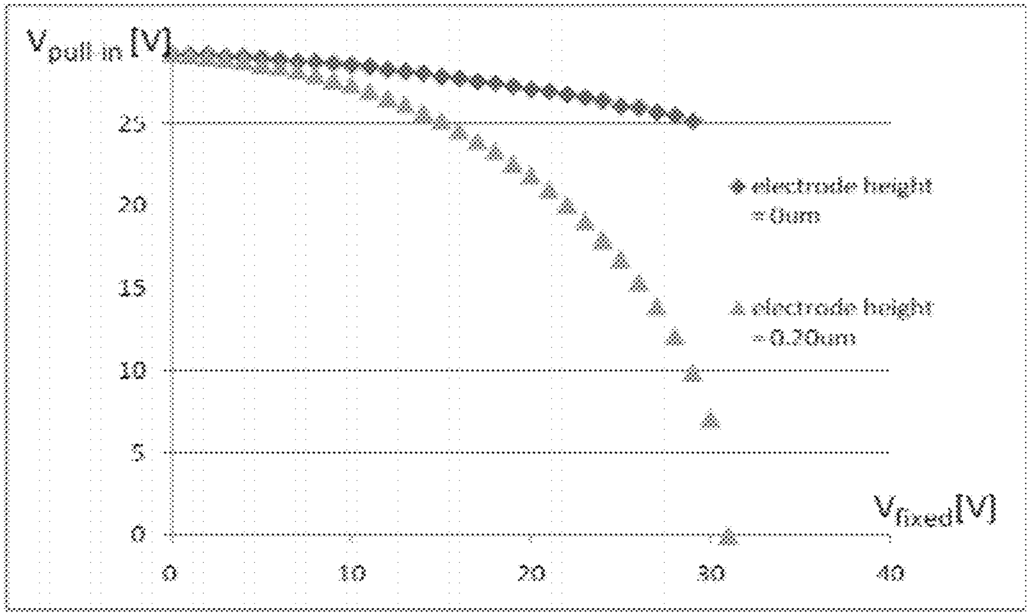
FIG. 13 shows the calculated pull-in voltage of a micromirror of one embodiment, as a function of the fixed electrode voltage, for two different electrode configurations.

In a first set of simulations, the first outer electrode 21 and the first inner electrode 22 were assumed to have substantially the same height. After every simulation cycle the voltage on the first outer electrode 21 was increased and the same fixed voltage was kept on the first inner electrode 22. At some point the voltage on the first outer electrode 21 is too high and the simulation does not reach a stable solution. This voltage substantially corresponds to the pull-in voltage for that fixed voltage on the first inner electrode 22. In FIG. 13 the pull-in voltage $V_{pull\text{-}in}$ thus obtained is shown as a function of the fixed voltage $V_{fixed}$ on the first inner electrode 22.

It can be seen that the pull-in voltage decreases with increasing fixed voltage on the first inner electrode 22, but this may be insufficient for some applications. In a second set of simulations a similar micromirror configuration was used, but the thickness of the first inner electrode 32 was 200 nm larger than the thickness of the first outer electrode 31 (as e.g. illustrated in FIG. 8). This way, the distance between the first inner electrode 32 and the micromirror 40 is smaller and thus the first inner electrode 32 has a stronger influence on the micromirror 40 and thus on the pull-in voltage. As can be concluded from the simulation results shown in FIG. 13 this set-up results in a good modulation of the pull-in voltage as a function of the fixed voltage value on the first inner electrode.

Advantageously, inner electrodes are slightly elevated with respect to the outer electrodes, i.e. they have a slightly larger height as compared to the outer electrodes, thus yielding a stronger attraction to the micromirror 40 (as they are closer to the micromirror) and consequently a better modulation of the pull-in voltage.

A method for operating or addressing a micromirror device 50 according to one embodiment is provided, wherein analog Pulse width modulation is performed at the MEMS level. In operation, a first fixed voltage difference $V_{CB}$ is applied between the micromirror 40 and the first inner electrode 42 and a second fixed voltage difference $V_{CW}$ is applied between the micromirror 40 and the second inner electrode 43, the fixed voltage differences having a substantially constant value during at least half a period, wherein a period for example corresponds to an image frame or a color sequential frame.

A voltage difference $V_{TB}$ with a waveform that is monotonous in the first half period and in the second half period of the signal, e.g. a triangular waveform or a saw-tooth waveform, is applied between the micromirror 40 and the first outer electrode 41 and a voltage difference $V_{TW}$ with a waveform that is monotonous in the first half period and in the second half period of the signal, e.g. a waveform in antiphase with $V_{TB}$, is applied between the micromirror 40 and the second outer electrode 44.

The method may be used for addressing a micromirror device 50 comprising a plurality of micromirrors 40, e.g. an array of micromirrors 40, wherein the periodic waveforms applied between the micromirrors 40 and the outer electrodes 41, 44 are common for the whole matrix. One period of the periodic waveforms, corresponds to one image frame.

In case of a color sequential micromirror array it corresponds to one color sequential frame. Within an image frame or within a color sequential frame, the value of the fixed voltage differences applied between the micromirror 40 and the inner electrodes 42, 43, determine at which moment the micromirror 40 rotates and thus which percentage of the frame time the micromirror is in the first tilted position (e.g. corresponding to a black pixel) and which percentage of the frame time the micromirror is in the second tilted position (e.g. corresponding to a white pixel). This determines the duty ratio and thus the gray level of the corresponding pixel.

In one embodiment, for subsequent image frames or color sequential frames the monotonous signals $V_{TB}$ and $V_{WB}$ are repeated in each frame, thus leading to a periodic signal with a monotonous waveform in each half period.

Figure 14:
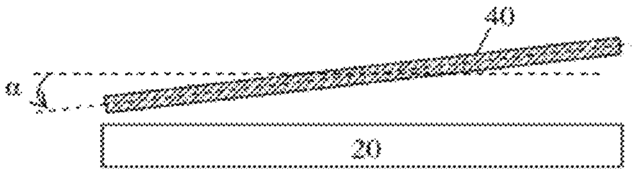
FIG. 14(*a*) shows control signals on the electrodes of a micromirror and the mirror angle, in accordance with one embodiment.

FIG. 14(*a*) shows control signals $V_{TW}$, $V_{TB}$, $V_{CW}$, $V_{CB}$ that can be used for addressing a micromirror 40 in one embodiment. In the example shown in FIG. 14(*a*) the periodic control signals $V_{TW}$ and $V_{TB}$ have a triangular waveform and are in antiphase with each other.

Figure 18:
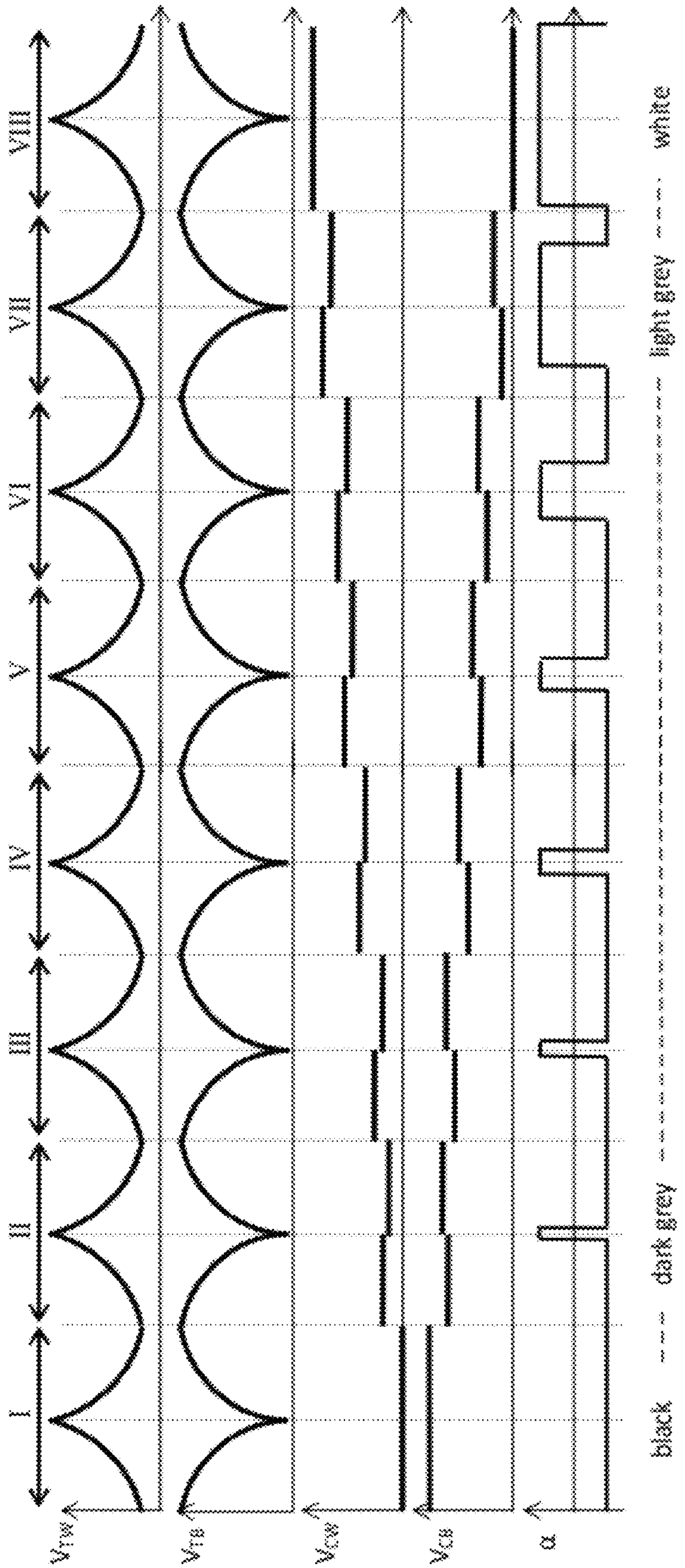
FIG. 18 shows gamma corrected 'triangular' waveforms.
Figure 19:
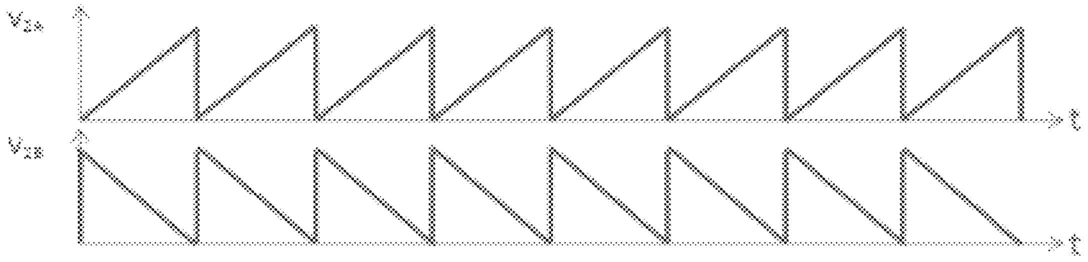
FIG. 19 shows periodic control signals that can be used for addressing a micromirror in one embodiment.
Figure 20:
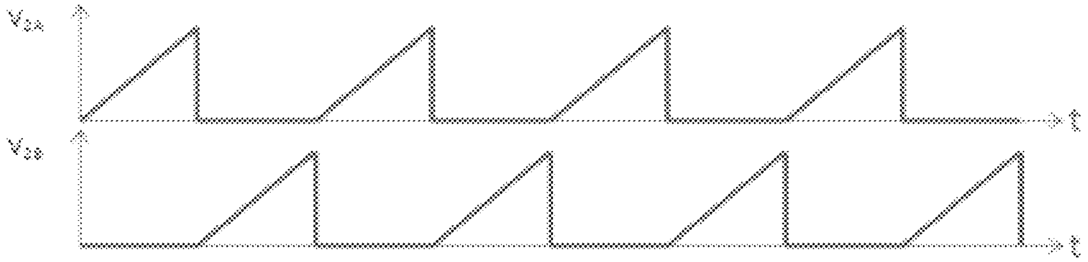
FIG. 20 shows periodic control signals that can be used for addressing a micromirror in one embodiment.

However, other suitable periodic signals with a monotonous waveform in each half period known to a person skilled in the art can be used (as e.g. further illustrated in FIGS. 18, 19 and 20).

FIG. 14(*a*) also shows the reaction a of the micromirror 40 to the control signals, wherein α is the angle the micromirror makes with respect to its horizontal position. FIG. 14(*b*) shows a micromirror 40 in a first tilted position and illustrates the mirror angle α, being defined as the angle between the micromirror surface and the substrate surface. When the micromirror 40 is in a horizontal position (i.e. substantially parallel to the substrate 20) the mirror angle α is zero. When the micromirror 40 is in the first tilted position (as illustrated in FIG. 14(*b*)) the mirror angle α is considered negative and when it is in the second tilted position (not illustrated) the mirror angle α is considered positive.

In FIG. 14(*a*), the periodic signal $V_{TW}$ represents a triangular control voltage difference that is applied between the micromirror 40 and the second outer electrode 44. When the micromirror 40 is pulled towards this second outer electrode 44, the micromirror 40 reflects light, e.g. through a lens. This corresponds to a white pixel or image. Signal $V_{TB}$ is a triangular voltage difference that is applied between the micromirror 40 and the first outer electrode 41. When the micromirror 40 is pulled towards this first outer electrode 41, light is not reflected into the lens. This corresponds to a black pixel or image.

In the example shown, the signal $V_{TB}$ is a triangular signal that is in anti-phase with $V_{TW}$. Voltage signals $V_{CB}$ and $V_{CW}$ are the fixed voltage differences that are applied between the micromirror 40 and respectively the first inner electrode 42 and the second inner electrode 43. These "fixed" voltage differences remain fixed or constant during half a period of the frame. Signal α represents the deflection of the mirror compared to its resting state (i.e. the horizontal state).

During period I (FIG. 14(*a*)), $V_{CB}$ is high and $V_{CW}$ is low. This way, the micromirror 40 is attracted to the first side (or black side) and stays in the first tilted position for the whole frame period. This results in a black pixel (e.g. on a screen) corresponding to a duty ratio δ of 0%.

During the first half of period II, the fixed voltage difference $V_{CW}$ between the micromirror 40 and the second inner electrode 43 is increased and the fixed voltage difference $V_{CB}$ between the micromirror 40 and the first inner electrode 42 is decreased. Therefore, at a certain point, the influence of $V_{TW}$ together with $V_{CW}$ becomes too strong, and makes the micromirror 40 flip or rotate to the other (second) side, corresponding to a white pixel. As illustrated in FIG. 13, the voltage difference $V_{TW}$ at which pull-in occurs is dependent on the voltage difference $V_{CW}$ between the micromirror 40 and the second inner electrode 43.

Therefore, to make the micromirror 40 flip at a predetermined point a, one can apply the voltage difference value $V_{CW}$ between the micromirror and the second inner electrode 43 that corresponds to pull-in at point a.

At the same time one can also apply the fixed voltage difference $V_{CB}$ corresponding with pull-out voltage at point a to the first inner electrode 42. This way pull-in and pull-out work together at point a.

During the second half of period II, a fixed voltage difference $V_{CW}$ corresponding to pull-out at point b is applied between the micromirror 40 and the second inner electrode 43 and a fixed voltage difference $V_{CB}$ corresponding to pull-in at point b is applied to the first inner electrode 42. This results in flipping of the micromirror towards the first tilted position, corresponding to a black pixel. In this way a duty ratio δ of for example 30% can be obtained, leading to a dark gray pixel for period II.

Similarly in period III $V_{CW}$ is further increased, and $V_{CB}$ is decreased. Points c and d (i.e. point where the micromirror 40 flips between two titled positions) are achieved respectively earlier and later as compared to the points a and b in period II. The duty ratio δ in this case can be for example about 70%, which leads to a light gray pixel.

During period IV $V_{CW}$ is set high and $V_{CB}$ is low. This corresponds to the micromirror 40 being held in the second tilted position, corresponding to a white image, for the whole period. A theoretical duty ratio δ of 100% can be reached.

In the example shown in FIG. 14(*a*), within each period the micromirror 40 is initially in the first tilted position, corresponding to a black image and at the end of the period the micromirror 40 returns to the first tilted position. This means that a duty ratio of 0% can be obtained (no switching of the micromirror), but that a duty ratio of 100% can only be approached (because of the switching between the first tilted position and the second tilted position and back to the first tilted position).

Selecting the right voltage difference values for $V_{CW}$ and $V_{CB}$ and the optimal periodic signals $V_{TW}$ and $V_{TB}$, one can reach any predetermined duty ratio of the micromirror and thus any predetermined gray level. This way of control implements PWM without needing an electronic comparator. Instead a 'comparator' is provided electromechanically through a combination of fixed and periodic signals. In one embodiment the pull-in voltages and the pull-out voltages may influence each other. This influence may be investigated experimentally. A common heuristic solution can be found such that the micromirror rotates or switches at the desired moment.

In FIG. 14(*a*) a method according to one embodiment is illustrated for a case wherein the voltage differences $V_{TW}$ and $V_{TB}$ applied between the micromirror and the outer electrodes have a triangular waveform. However, other waveforms can be used, as for example illustrated in FIG. 19 and FIG. 20. FIG. 19 illustrates an embodiment wherein the periodic signals have a saw-tooth waveform. For example, a saw-tooth voltage difference $V_{2A}$ can be applied between the micromirror and the first outer electrode 41 and an antiphase saw-tooth voltage difference $V_{2B}$ can be applied between the micromirror and the second outer electrode 44.

For each period, fixed voltage differences between the micromirror and the inner electrodes determine the moment when the micromirror flips or rotates into another tilted position. In this embodiment the micromirror can only flip once per period, and the initial position of the micromirror is different from period to period (as opposed to the example illustrated in FIG. 14(*a*), wherein the micromirror always starts from the 'black' position).

In another embodiment, illustrated in FIG. 20, the periodic signals $V_{2A}$ and $V_{2B}$ have an interrupted saw-tooth waveform.

Although the method is described with voltage differences having a periodic waveform between the micromirror and the outer electrodes and with fixed voltage differences between the micromirror and the inner electrodes, in other embodiments fixed voltage differences may be applied between the micromirror and the outer electrodes and voltage differences with a periodic waveform, may be applied between the micromirror and the inner electrodes. Other suitable combinations of waveforms may be used.

In "Micromirror device with reversibly adjustable properties", IEEE Photonics Technology Letters, Vol. 15, Bo. 5, pp. 733-735, 2003, Bochobza-Degani et al, which is incorporated herein by reference in its entirety, shows a micromirror design with four electrodes on one side of a torsion actuator, wherein two triangular waveforms are applied to the electrodes, the voltage ratio of the waveforms β influencing the pull-in and pull-out moments of the torsional mirror. This results in a pulse width modulated position of the mirror dependent on β. The design of one embodiment is different in that the micromirror of one embodiment can be flipped to both sides, whereas the one-side-attractable mirror described by Bochobza-Degani et al. inherently can only pull in and out.

Figure 12:
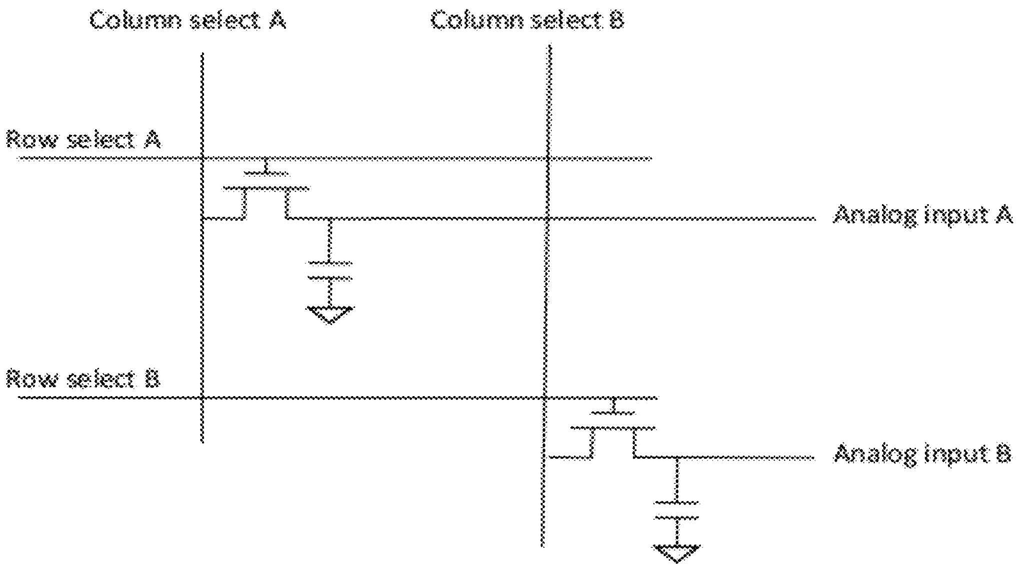
FIG. 12 is a schematic illustration of an active matrix cell corresponding to one micromirror.

In one embodiment, the pull-in time can be adjusted with a fixed voltage value on e.g. the inner electrode instead of a tuned triangular waveform. This way an active matrix circuit (as shown in FIG. 12) can be used for applying and storing the fixed voltage difference values, as the two triangular waveforms are common for all the mirrors.

The two inner electrodes each can have a MOSFET switch that connects their column busbar (source) to a storage capacitor (drain) if the corresponding row (gate) is high. So they get an analog voltage value that remains constant during the frame time.

Figure 15:
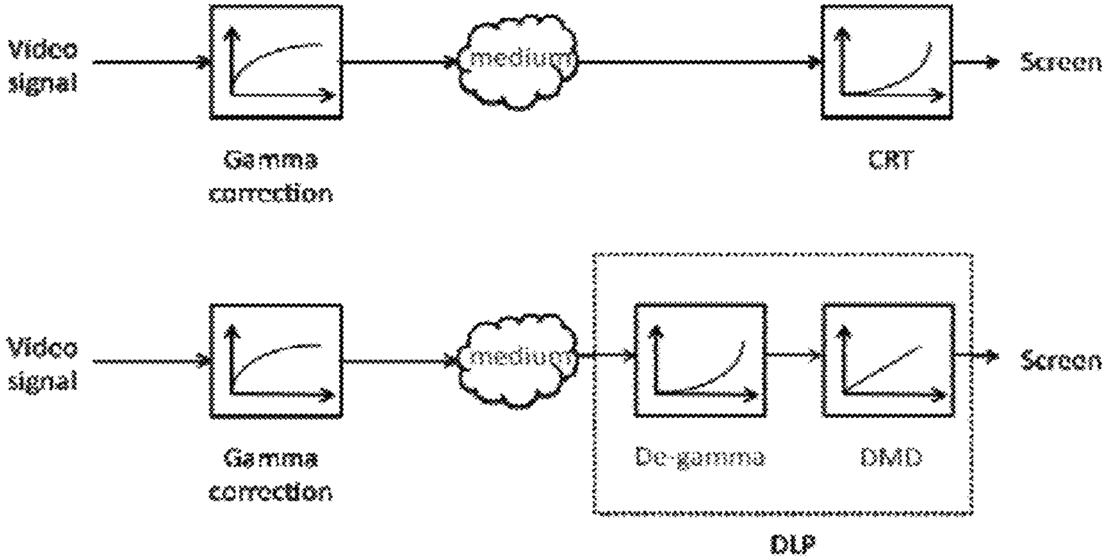
FIG. 15 is a schematical comparison between CRT and DMD.

Video signals are often gamma corrected to compensate for the non-linear voltage-to-light characteristic of cathode-ray tubes (CRT), as schematically illustrated in FIG. 15. This correction follows a logarithmic relationship, inverse to the CRT characteristic, which is a power-law relationship. Gamma corrected video signals are still common practice. Therefore, for example DMD needs a de-gamma process to 'decode' these video signals, because DMD inherently has a linear voltage-to-light characteristic.

Figure 16:
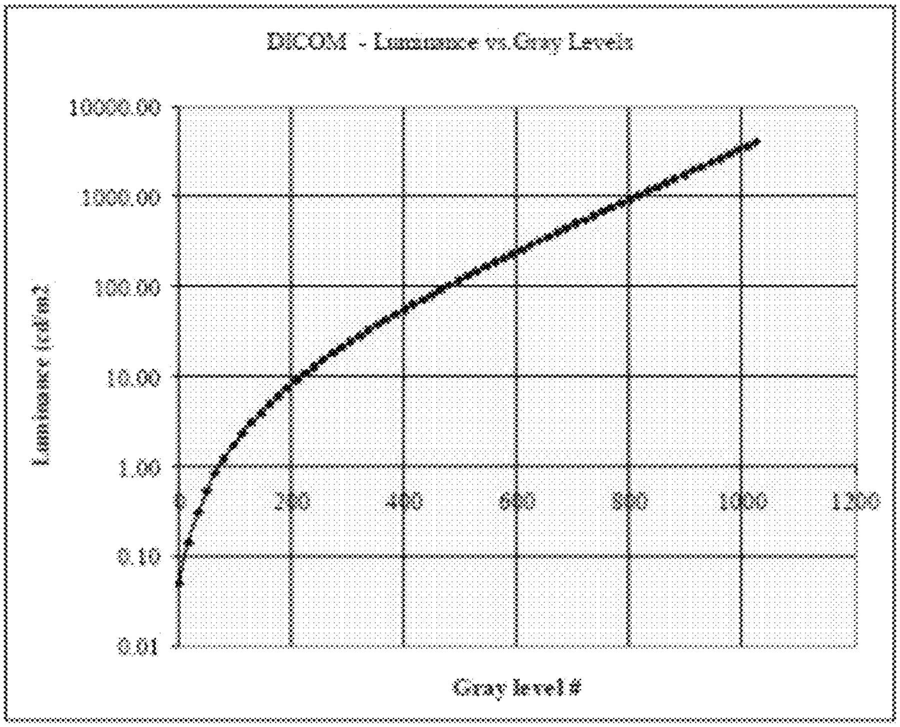
FIG. 16 shows the luminance versus gray levels (DICOM curve).

In FIG. 16, an approximation of the lightness experienced through the human vision system is shown as a function of the relative luminance observed. This is the DICOM standard used in medical displays. This shows that dark levels can be better distinguished by the human eye than brighter levels.

Figure 17:
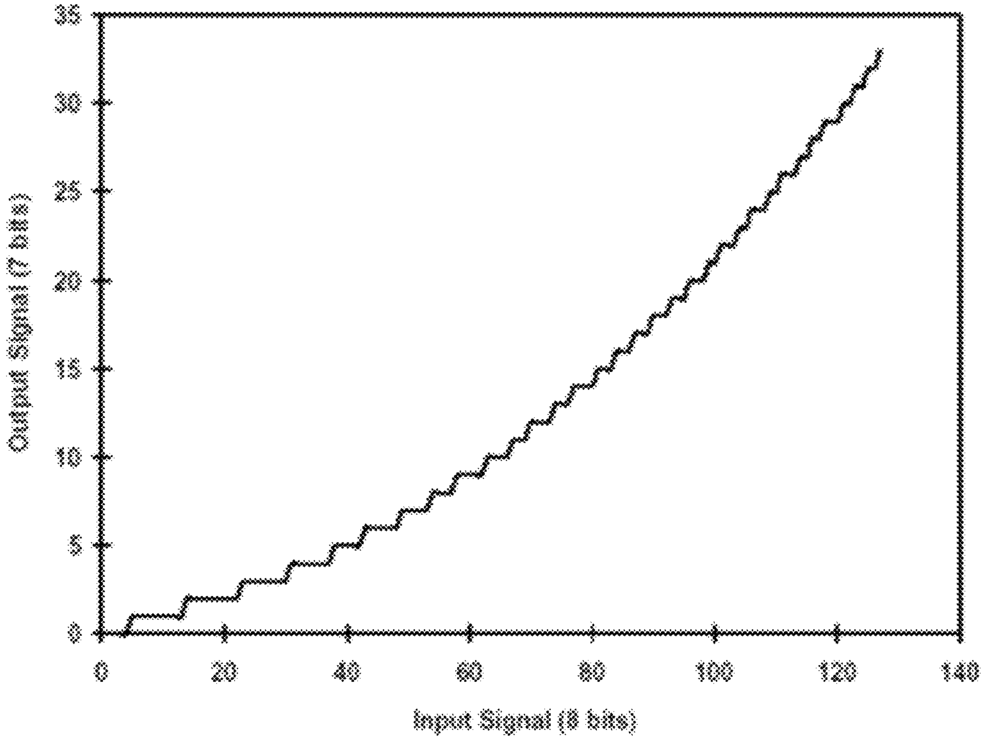
FIG. 17 illustrates a seven-bit de-gamma response.

In FIG. 17, a de-gamma curve, e.g. for a DMD device, is shown using a 7 bit linear output resolution. Because of the poor and equidistant output level distribution, the lower output levels lead to objectionable contours in the image. To overcome this contouring effect, a higher output bit depth is needed to get more levels at the low intensity side.

In the design of one embodiment, there is no need for choosing equidistant intensity levels and therefore there is no need to increase the output bit depth. The appropriate fixed voltage difference values can be selected in such a way that more dark output levels and less bright levels are available, meeting the psychometric lightness curve or the non-equidistant DICOM distribution. Another approach could comprise e.g. correcting triangular waveforms into 'gamma corrected' waveforms as shown in FIG. 18, following the gamma response.

EXAMPLE

The experimental design of the mirror has 2 attracting electrodes and 1 landing electrode at either side of the mirror. One electrode is used as 'fixed' electrode, influencing the other attracting electrode's pull-in voltage. A general triangular waveform was applied to the outer electrodes at either side of the mirror, the 'fixed' electrode voltage determines the duty cycle of the mirror. The mirror implements analog PWM, without needing transistors for a comparator at the CMOS level. When each 'fixed' electrode is connected to an active matrix cell, an active matrix display can be formed. The mirrors with variable pull-in voltage were fabricated using SiGe as structural layer. The variable pull-in principle was demonstrated by measurements on these SiGe mirrors.

Figure 21:
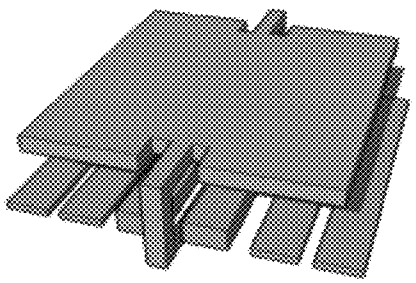
FIG. 21 shows Micromirror design with four active electrodes and two landing electrodes.

In this example, an active matrix display with a micromirror design according to one embodiment containing 4 addressing electrodes (See FIG. 21) was built. The analog PWM occurs at the MEMS level. For convenience, the two inner electrodes were provided with a fixed voltage value and the two outer electrodes, provided with two anti-phase triangular waveforms, common for the whole matrix.

The inner electrodes (second and third) receiving fixed voltage were chosen slightly elevated with respect to the outer electrodes receiving "triangular waveform", so the inner electrodes yield a stronger attraction to the mirror (closer to the mirror, see FIG. 8*b*). The fixed voltage value on the inner electrodes (second and third electrodes) can influence the pull-in voltage of this structure. This way an active matrix circuit (see FIG. 12) can be used for applying and storing the fixed voltage values, as the two triangular waveforms are common for all the mirrors. The two inner "fixed voltage" electrodes each have a MOSFET switch that connects their column busbar (source) to a storage capacitor (drain) if the corresponding row (gate) is high. So they get an analog voltage value that remains constant during the time frame.

Figure 22:
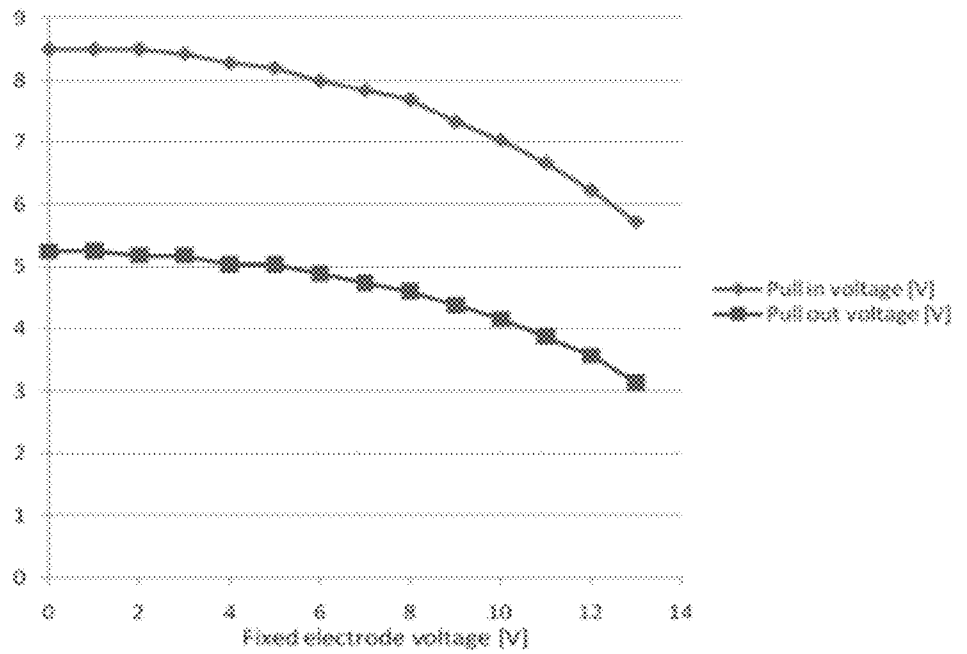
FIG. 22 shows experimental results as described in the example.

Pull-in and pull-out voltages were measured on fabricated micromirrors with SiGe used as structural layer. The measurement was performed using a laser Doppler vibrometer. The results are presented in FIG. 22. As expected, the fixed electrode voltage modulates the pull-in voltage and also the pull-out voltage.

Figure 23:
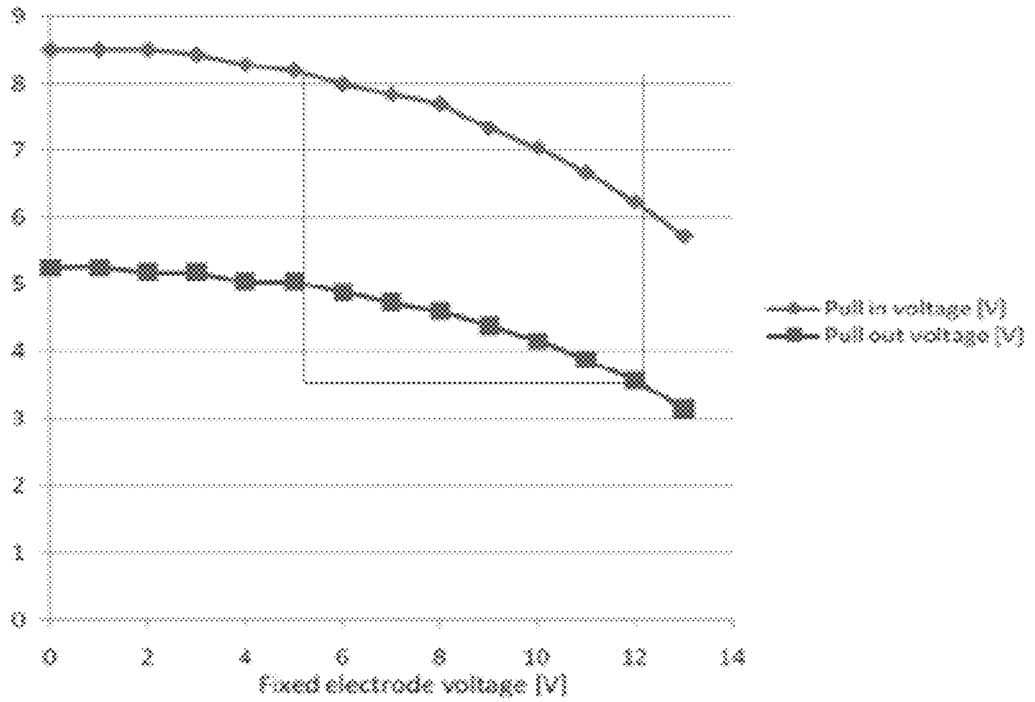
FIG. 23 shows experimental pull-in and pull-out voltages of a device of one embodiment.
Figure 24:
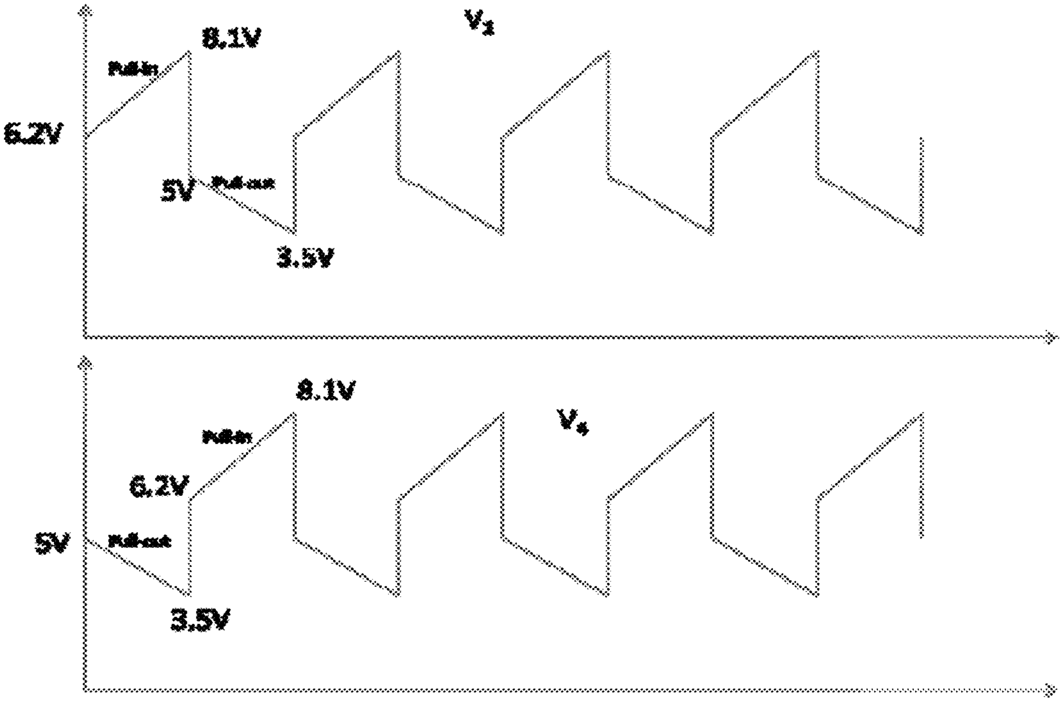
FIG. 24 shows periodic voltage signals that can be applied to first and fourth electrodes of the device of one embodiment. This periodic voltage signal is particularly adapted to the pull-in pull-out characteristics of FIG. 23.

In a second example, the periodic signals where optimized to take into account the experimental pull-in and pull-out voltages. FIG. 23 shows measured pull-in and pull-out as a function of a fixed electrode voltage. Given these measurement results, a signal as shown in FIG. 24 was derived (with $V_1$ applied to the first electrode and $V_4$ to the fourth electrode). This signal is a periodic waveform that could be used as an alternative to e.g. a triangular waveform. The raising edge starts at a minimum voltage for pull-in (6.2 V in the example shown) and increases linearly up to a voltage for which pull-in occurs at the latest (8.1V in the example shown).

The trailing edge is associated to pull-out in a similar way (decreasing from 5 V to 3.5 V in the example shown).

In the example shown, the DC voltage on the second and third electrodes is in between 5 V and 12 V.

From those results, one can be easily derive a method wherein the DC voltage on the second and third electrodes are not higher than 5V (i.e. in the range between −5V and +5V). For example, one could provide a voltage of −5V on the mirror itself (and on the landing electrodes), such that the voltages of the periodic waveform can be lowered with 5V. This adaptation would improve compatibility of the method with the CMOS standards (voltages between 0V and 5V).

Figure 25:
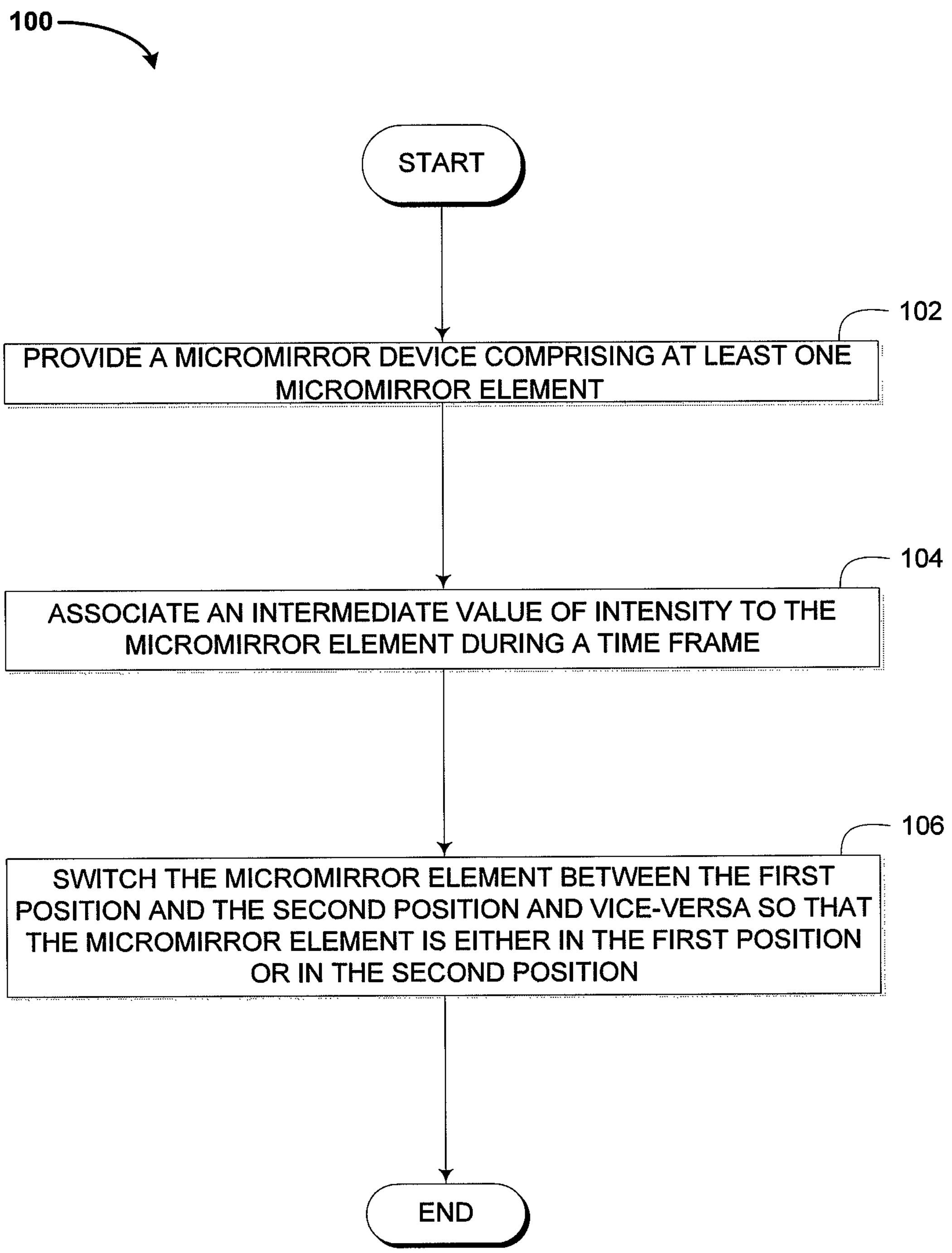
FIG. 25 shows a flowchart of one embodiment of a method of operating by pulse width modulation a micromirror device.

FIG. 25 shows a flowchart of one embodiment of a method of operating by pulse width modulation a micromirror device. The method 100 comprises, at block 102, providing a micromirror device comprising at least one micromirror element being electrostatically deflectable around a rotation axis between at least two positions being a first position and a second position. The micromirror element is controlled by applying voltage signals to at least four electrodes, the four electrodes comprising a first and second electrode located on one side of the rotation axis and a third and fourth electrode on the other side.

Next at block 104, the method comprises associating an intermediate value of intensity to the micromirror element during a time frame, the intensity being between a first value and a second value, the first value corresponding to the first position and the second value corresponding to the second position.

Moving to block 106, the method comprises switching the micromirror element between the first position and the second position and vice-versa so that the micromirror element is either in the first position or in the second position, the intermediate value of intensity corresponding to the ratio of periods of time in the time frame in which the micromirror element is either in the first position or in the second position. In one embodiment, the switching is obtained by applying fixed voltage signals to the second and third electrodes during the time frame while applying periodic voltage signals having a period equal to the length of the time frame to the first and fourth electrodes, the fixed voltage signals being kept constant during half of the time frame.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. Furthermore, aspects of the invention can be implemented in a computer program product stored in a computer-readable medium for execution by a programmable processor. Method steps of aspects of the invention may be performed by a programmable processor executing instructions to perform functions of those aspects of the invention, e.g., by operating on input data and generating output data. Accordingly, the embodiment includes a computer program product which provides the functionality of any of the methods described above when executed on a computing device. Further, the embodiment includes a data carrier such as for example a CD-ROM or a diskette which stores the computer product in a machine-readable form and which executes at least one of the methods described above when executed on a computing device.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of operating a micromirror device comprising:

providing a micromirror device comprising at least one micromirror element being electrostatically deflectable around a rotation axis between at least two positions being a first position and a second position, the micromirror element being controlled by applying voltage signals to at least four electrodes, the four electrodes comprising a first and second electrode located on one side of the rotation axis and a third and fourth electrode on the other side;

associating an intermediate value of intensity to the micromirror element during a time frame, the intensity being between a first value and a second value, the first value corresponding to the first position and the second value corresponding to the second position;

switching the micromirror element between the first position and the second position and vice-versa so that the micromirror element is either in the first position or in the second position, the intermediate value of intensity corresponding to a ratio of periods of time in the time frame in which the micromirror element is either in the first position or in the second position, wherein the switching is obtained by applying fixed voltage signals to the second and third electrodes during the time frame while applying periodic voltage signals having a period equal to the length of the time frame to the first and fourth electrodes, the fixed voltage signals being kept constant during half of the time frame.

2. The method according to claim 1, wherein the periodic signals are characterized by a monotonic variation in a first half of their period, and a monotonic variation in a second half of their period.

3. The method according to claim 1, wherein the first and fourth voltage signals are antiphase signals.

4. The method according to claim 1, wherein the periodic voltage signals correspond to voltage differences that are directly applied between the micromirror element and the first and fourth electrodes, and wherein the second and third fixed voltage signals correspond to voltage differences that are applied between the micromirror element and the second and third electrodes.

5. The method according to claim 1, wherein the periodic voltage signals are in the form of a triangular waveform, a saw-tooth waveform, gamma corrected triangular waveform, or sinusoidal waveform signal.

6. The method according to claim 1, wherein the first value of intensity corresponds to a white pixel while the second value of intensity corresponds to a black pixel with the intermediate value of intensity corresponding to gray levels in between.

7. The method according to claim 1, wherein the first value of intensity corresponds to a colored status while the second value of intensity corresponds to a non colored status with intermediate colored levels in between.

8. A micromirror device comprising:

at least one micromirror, each micromirror being configured to rotate along an axis parallel to the micromirror from a first position to a second position;

a substrate underneath the micromirror;

at least four controlling electrodes for each micromirror, the at least four controlling electrodes comprising a first and a second set, each set comprising two controlling electrodes, a first controlling electrode of each set being located on one side of the rotation axis of the micromirror and a second controlling electrode of each set being located on the other side of the rotation axis of the micromirror, wherein each electrode of the second set is connected to a circuit, the circuit being configured to keep, in use, a constant analog voltage signal during half of a time frame.

9. The micromirror device according to claim 8, wherein the circuit connected to each electrode of the second set comprises a storage capacitor configured to keep a fixed analog voltage during the time frame.

10. The micromirror device according to claim 9, wherein the circuit connected to each electrode of the second set comprises a MOSFET switch.

11. A spatial light modulator comprising a micromirror device according to claim 8.

12. A system for operating a micromirror device, the micromirror device comprising at least one micromirror element being electrostatically deflectable around a rotation axis between at least two positions being a first position and a second position, the micromirror device further comprising a first and second electrode located on one side of the rotation axis and a third and fourth electrode on the other side, the system comprising:

means for associating an intermediate value of intensity to the micromirror element during a time frame, the intensity being between a first value and a second value, the first value corresponding to the first position and the second value corresponding to the second position; and means for switching the micromirror element between the first position and the second position and vice-versa so that the micromirror element is either in the first position or in the second position, the intermediate value of intensity corresponding to a ratio of periods of time in the time frame in which the micromirror element is either in the first position or in the second position, wherein the switching is obtained by applying fixed voltage signals to the second and third electrodes during the time frame while applying periodic voltage signals having a period equal to the length of the time frame to the first and fourth electrodes, the fixed voltage signals being kept constant during half of the time frame.

13. The system according to claim 12, wherein the periodic signals are characterized by a monotonic variation in a first half of their period, and a monotonic variation in a second half of their period.

14. The system according to claim 12, wherein the first and fourth voltage signals are antiphase signals.

15. The system according to claim 12, wherein the periodic voltage signals correspond to voltage differences that are directly applied between the micromirror element and the first and fourth electrodes, and wherein the second and third fixed voltage signals correspond to voltage differences that are applied between the micromirror element and the second and third electrodes.

16. The system according to claim 12, wherein the periodic voltage signals are in the form of a triangular waveform, a saw-tooth waveform, gamma corrected triangular waveform, or sinusoidal waveform signal.

17. The system according to claim 12, wherein the first value of intensity corresponds to a white pixel while the second value of intensity corresponds to a black pixel with the intermediate value of intensity corresponding to gray levels in between.

18. The system according to claim 12, wherein the first value of intensity corresponds to a colored status while the second value of intensity corresponds to a non colored status with intermediate colored levels in between.

* * * * *